US012670057B2

(12) United States Patent
Molander et al.

(10) Patent No.: US 12,670,057 B2
(45) Date of Patent: Jun. 30, 2026

(54) COMPUTER TASK MANAGEMENT SYSTEM AND METHOD

(71) Applicant: Lenovo (Singapore) Pte. Ltd., Singapore (SG)

(72) Inventors: Mark Edward Molander, Cary, NC (US); Daniel Bondas, Morrisville, NC (US); Andrew James Palay, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 14 days.

(21) Appl. No.: 18/812,673

(22) Filed: Aug. 22, 2024

(65) Prior Publication Data

US 2026/0056823 A1     Feb. 26, 2026

(51) Int. Cl.
| *G06F 11/00* | (2006.01) |
| *G06F 11/07* | (2006.01) |
| *G06Q 10/0631* | (2023.01) |

(52) U.S. Cl.
CPC ...... *G06F 11/0784* (2013.01); *G06F 11/0751* (2013.01); *G06F 11/0793* (2013.01); *G06Q 10/06311* (2013.01)

(58) Field of Classification Search
USPC ........................................................ 714/1–57
See application file for complete search history.

(56) References Cited

U.S. PATENT DOCUMENTS

| 11,755,405 | B1 * | 9/2023 | Satish | ................. | G06F 11/0769 714/57 |
| 2015/0286519 | A1 * | 10/2015 | Huang | ................ | G06F 11/0709 714/47.3 |
| 2018/0060168 | A1 * | 3/2018 | Kelly | .................. | G06F 11/1076 |
| 2019/0324841 | A1 * | 10/2019 | Patel | .......................... | G06N 5/02 |
| 2020/0192743 | A1 * | 6/2020 | Harper | ................ | G06F 11/0793 |
| 2020/0302549 | A1 * | 9/2020 | Jordan, II | ............ | G06Q 50/163 |
| 2022/0120727 | A1 * | 4/2022 | Al-Dabbagh | ......... | G06F 16/285 |
| 2023/0134493 | A1 * | 5/2023 | Ghosh | ................. | G06F 11/1417 714/15 |
| 2023/0161662 | A1 * | 5/2023 | Wollny | ................ | G06F 11/004 714/48 |
| 2023/0236923 | A1 * | 7/2023 | Gowri | ................ | G06F 11/0709 714/4.1 |

* cited by examiner

*Primary Examiner* — Sarai E Butler
(74) *Attorney, Agent, or Firm* — Carroll, Hoette & Butscher, LLC; Mary D. Lawlor

(57)                ABSTRACT

A computer task management system and method are described that detect an issue regarding a first computer device in a group of monitored computer devices, and determine a remedial action to address the issue. The issue and the remedial action constitute a first task item. The system and method group the first task item with task items associated with other computer devices to compile a task set. The task set is compiled based on a common remedial action and/or a shared location of the computer devices associated with the task set. The system and method assign the task set to a first user of multiple different users for managing the task set, and generate a notification message for presentation on a display device. The notification message describes a collective remedial action to address the task set and prompts the first user to affirm the collective remedial action.

20 Claims, 5 Drawing Sheets

400

| Relevant Factors | Jane | Joe | Otto |
|---|---|---|---|
| General Availability | 40 | 70 | 10 |
| Data center access | 30 | 25 | 70 |
| HW Proficiency | 10 | 80 | 80 |
| Weighted Score | 80 | 175 | 160 |

304 · 302 · 404 · 402

300

| Factors | Jane | Joe | Otto |
|---|---|---|---|
| FW Update Proficiency | 50 | 60 | 50 |
| Configuration Compliance | 30 | 40 | 20 |
| General Availability | 40 | 70 | 10 |
| Data center access | 30 | 25 | 70 |
| Networking Proficiency | 20 | 75 | 30 |
| Storage Proficiency | 60 | 35 | 50 |
| HW Proficiency | 10 | 80 | 80 |

304 · 302 · 306

0 = Cannot do the task
50 = Average
100 = Excellent at task

Joe's updated display device:

COMPUTER TASK MANAGEMENT SYSTEM AND METHOD

FIELD

The present disclosure generally relates to systems that monitor groups of computer devices to maintain operation of the computer devices over time and avoid performance interruptions.

BACKGROUND OF THE INVENTION

Some systems monitor groups of computer devices and perform tasks to maintain operation of the computer devices over time with limited downtime. The computer devices that are monitored may be organized in multiple clusters located in different facilities, such as data centers. Example computer devices can include servers. The clusters of computer devices may perform cloud computing to provide on-demand availability of data storage, computing power, and/or other computer system resources through a network. Task management systems can be employed to monitor the groups of computer devices and alert users (e.g., human operators) when an issue is detected that needs to be addressed before the issue interrupts the computer operations. Some issues can include warranties expiring, software and firmware requiring updates, hardware needing to be replaced, and/or the like. The computer task management system detects issues that require attention, and generates tasks for presentation to a user assigned to manage the computer devices. One example task may be to renew a warranty on a first computer. A second task may be to update software on a second computer. The computer task management system may display the tasks on a graphical user interface (GUI). The user is able to view the GUI and interact with the GUI to address the tasks and keep the computer devices up-to-date and operational.

Known computer task management systems have several drawbacks that result in inefficient and ineffective management of the monitored computer devices. For example, the computer task management system may perform the same or a similar sequence of computational operations each time that a new issue is detected. The computational operations may involve analyzing the issue, determining an appropriate remedial action to address the issue, and generating a discrete notification message to display a new task on the GUI. The task management system may be inefficient by performing redundant computational operations for a multitude of individual, low-level tasks. The GUI can get cluttered by the multitude of tasks to manage, which makes it difficult for users to discern relevant tasks and prioritize the tasks.

Furthermore, the task management system may display the same pending tasks to respective devices of multiple users that have access to the system, without differentiating the task-related information provided to different users. The task management system may not assist users with determining which user should address certain tasks. It may be difficult for different users, such as members of an information technology (IT) team, to discern which user is the most appropriate user to handle a first task and which user is most appropriate to handle a second task in order to provide reliable and efficient task management. In another example, a task management system may only present a certain task to the computer of a single specific user, without notifying other users about the task. This approach lacks transparency.

A given task may not be timely addressed and completed if the specific user that is notified is not available or competent.

A need remains for a task management system that can intelligently group related tasks and assign the grouped tasks to appropriate users for reliably and efficiently managing the monitored computer devices to reduce the risk of interrupted operation.

SUMMARY

In accordance with an example or aspect, a method (e.g., for managing and monitoring computer devices) is provided that includes detecting an issue regarding a first computer device in a group of monitored computer devices. The method includes determining, via one or more processors, a remedial action to address the issue. The issue and the remedial action constitute a first task item. The method includes grouping the first task item with task items associated with other computer devices in the group of monitored computer devices to compile a task set. The task set is compiled based on at least one of a common remedial action or a shared location of the computer devices associated with the task set. The method includes assigning the task set to a first user of multiple different users for managing the task set and generating, via the one or more processors, a notification message for presentation on a display device. The notification message includes graphical content that describes a collective remedial action to address the task set. The notification message is generated to prompt the first user to affirm the collective remedial action.

Optionally, the issue regarding the first computer device may include an expiring warranty, outdated software, outdated firmware, a defective hardware component, and/or a hardware component approaching an end of a designated operating lifetime of the hardware component. The remedial action to address the issue may include renewing the warranty of the first computer device that is expiring, updating the software that is outdated, updating the firmware that is outdated, and/or ordering at least one hardware component for the first computer device to replace the defective hardware component and/or the hardware component that is approaching the end of the designated operating lifetime.

Optionally, assigning the task set to the first user may include comparing the multiple different users with respect to multiple factors. The multiple factors may include at least two of: (i) competency in performing the collective remedial action, (ii) accessibility to the computer devices associated with the task set, (iii) proximity to the computer devices associated with the task set, or (iv) availability to perform the collective remedial action within a designated time period. The method may include determining a weighted score for at least some of the multiple different users based on weight values assigned to the different users with respect to the multiple factors. Assigning the task set to the first user may include comparing the weighted score of the first user to the weighted scores of other users in the multiple different users.

The method may include displaying the notification message on a screen of the display device for viewing by the first user. The task set may be compiled based on both the common remedial action and the shared location of the computer devices associated with the task set. Generating the notification message may include presenting a virtual button on a graphical user interface. The virtual button may be associated with the collective remedial action. Responsive to receiving an input selection signal generated via a user input device and indicating selection of the virtual button, the method may include performing, via the one or more processors, the collective remedial action for the computer devices associated with the task set.

The method may include determining a secondary user of the multiple different users, and generating a second notification message for presentation on a second display device. The second notification message may include graphical content that identifies the first user and prompts the secondary user to take over managing the task set for the first user. The method may include determining a tertiary user of the multiple different users, and generating a third notification message for presentation on a third display device. The third notification message may include graphical content that identifies the first user and the secondary user.

The method may include detecting a new issue regarding a second computer device in the group of monitored computer devices after generating the notification message, and determining, via the one or more processors, a new remedial action to address the new issue. The new issue and the new remedial action constitute a new task item. The method may include updating the notification message to incorporate information about the new task item into the task set in response to determining that (i) the new remedial action is the common remedial action and/or (ii) the second computer device is located at the shared location of the computer devices associated with the task set. Updating the notification message to incorporate the information about the new task item may include incrementing a count in the graphical content.

In accordance with an example or aspect, a computer management system is provided that includes a memory configured to store program instructions and one or more processors operably connected to the memory. The program instructions are executable by the one or more processors to detect an issue regarding a first computer device in a group of monitored computer devices and determine a remedial action to address the issue. The issue and the remedial action constitute a first task item. The program instructions are executable by the one or more processors to group the first task item with task items associated with other computer devices in the group of monitored computer devices to compile a task set. The task set is compiled based on a common remedial action and/or a shared location of the computer devices associated with the task set. The program instructions are executable by the one or more processors to assign the task set to a first user of multiple different users for managing the task set, and generate a notification message for presentation on a display device. The notification message includes graphical content that describes a collective remedial action to address the task set. The one or more processors are configured to generate the notification message to prompt the first user to affirm the collective remedial action.

Optionally, the program instructions may be executable by the one or more processors to assign the task set to the first user by comparing the multiple different users with respect to multiple factors. The multiple factors may include at least two of: (i) competency in performing the collective remedial action, (ii) accessibility to the computer devices associated with the task set, (iii) proximity to the computer devices associated with the task set, or (iv) availability to perform the collective remedial action within a designated time period.

The program instructions may be executable by the one or more processors to present, as part of the notification message, a virtual button on a graphical user interface. The virtual button may be associated with the collective remedial action. Responsive to receiving an input selection signal generated via a user input device and indicating selection of the virtual button, the program instructions may be executable by the one or more processors to perform the collective remedial action for the computer devices associated with the task set.

The program instructions may be executable by the one or more processors to determine a secondary user of the multiple different users and generate a second notification message for presentation on a second display device. The second notification message may include graphical content that identifies the first user and prompts the secondary user to take over managing the task set for the first user.

The program instructions may be executable by the one or more processors to detect a new issue regarding a second computer device in the group of monitored computer devices after generating the notification message. The program instructions may be executable by the one or more processors to determine a new remedial action to address the new issue, where the new issue and the new remedial action constitute a new task item. The program instructions may be executable by the one or more processors to update the notification message to incorporate information about the new task item into the task set in response to determining that (i) the new remedial action is the common remedial action and/or (ii) the second computer device is located at the shared location of the computer devices associated with the task set.

In accordance with an example or aspect, a computer program product includes a non-transitory computer readable storage medium. The non-transitory computer readable storage medium includes computer executable code configured to be executed by one or more processors to detect an issue regarding a first computer device in a group of monitored computer devices and determine a remedial action to address the issue. The issue and the remedial action constitute a first task item. The computer executable code is configured to be executed by one or more processors to group the first task item with task items associated with other computer devices in the group of monitored computer devices to compile a task set. The task set is compiled based on a common remedial action and/or a shared location of the computer devices associated with the task set. The computer executable code is configured to be executed by one or more processors to assign the task set to a first user of multiple different users for managing the task set and generate a notification message for presentation on a display device. The notification message includes graphical content that describes a collective remedial action to address the task set. The one or more processors are configured to generate the notification message to prompt the first user to affirm the collective remedial action.

The computer executable code may be configured to be executed by the one or more processors to receive an input selection signal generated via a user input device and indicating affirmance of the collective remedial action. The computer executable code may be configured to be executed by the one or more processors to perform the collective remedial action for the computer devices associated with the task set in response to receiving the input selection signal.

DETAILED DESCRIPTION

Figure 1:
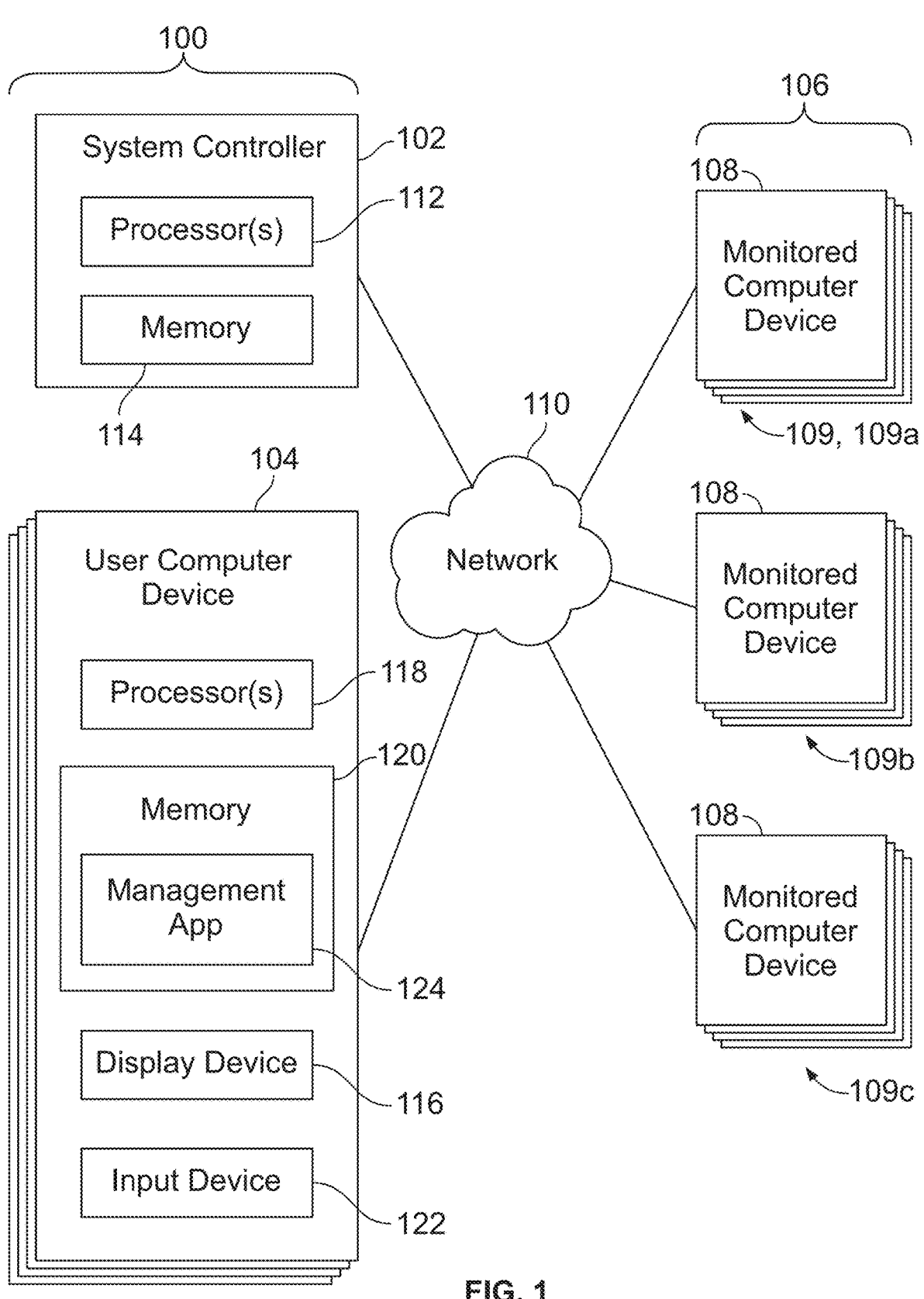
FIG. 1 is a block diagram of a computer management system according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

References herein to "computer device", unless specified, shall mean any of various types of hardware devices that perform processing operations, such as servers, computer workstations, personal computers, and the like. The personal computers may include laptop (e.g., notebook) computers, desktop computers, tablet computers, smartphone computers, wearable computers, and the like.

As used herein, the terms "software program", "software", and "program" are interchangeable and shall mean a set of instructions programmed on a hardware device, such as a computer device. The instructions are executable by the hardware device to perform a function. These terms "software program" and "software" encompass different classes of software, such as embedded server firmware, component firmware, component drivers, operating systems, and applications. Firmware provides low-level control for the corresponding device to interact with other computer hardware. A specific software program may have different versions over time.

References herein to "machine learning" shall mean artificial intelligence (AI) algorithms that learn from various automatic or manual feedback, such as observations and/or data. The AI algorithms may be adjusted over multiple iterations based on the observations and/or data. For example, the AI algorithms may be adjusted by supervised learning, unsupervised learning, and/or reinforcement learning (e.g., customer feedback). Non-limiting examples of AI algorithms include decision trees, K-means, deep learning, artificial neural networks, and/or the like.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The embodiments described herein provide a computer management system that intelligently compiles information from multiple discrete issues (e.g., alerts) into a task set. The computer management system determines a collective remedial action to address all of the issues in the task set, and generates notification messages for display. The computer management system also determines which user of multiple different users is most appropriate for managing the task set and assigns the task set to that user. The computer management system may seamlessly accommodate users with different proficiency levels for different types of tasks. The computer management system may designate one or more other users to backup roles for handling the task set if the assigned primary user is unwilling or unable. The notification messages are generated to inform the users with assigned roles about the task set and to prompt one or more of the assigned users to affirm the collective remedial action. The computer management system described herein intelligently aggregates tasks and assigns the task set to appropriate users for reliably and efficiently managing the monitored computer devices to maintain uninterrupted operation of the monitored computer devices.

The embodiments described herein improve the functionality of computers and solve technical problems. The embodiments described herein provide efficient and effective management of the monitored computer devices. The embodiments intelligently group related tasks and determine collective remedial actions to efficiently address multiple tasks in a task set, unlike known task management programs. The embodiments described herein aggregate different tasks into a task set that can be resolved via a collective remedial action. The embodiments improve the functionality of the computer by reducing redundant computational operations. For example, rather than handle each issue individually, the embodiments described herein discover connections between issues to aggregate related tasks and reduce the number of discrete tasks requiring user input. The embodiments described herein reduce the computational loads and avoid redundancies by constructively handling multiple tasks as a single task with a single remedial action. As a technical effect, the computational workload of the computer management system described herein is reduced relative to known task management systems. Furthermore, aggregating related tasks into task sets may reduce the amount of information that is displayed to a user on a graphical user interface. The graphical user interface may be more organized and less crowded by displaying task set notifications, as opposed to individual task notifications. The user viewing the displayed notification messages may be able to quickly discern relevant task information and prioritize tasks. Furthermore, as new issues are detected, the computer management system described herein determines whether each new issue can be grouped with an existing task set. If a first new issue can be compiled into an existing task set, the computer management system may update the notification message to incorporate information about the first new issue. Updating an existing notification message, such as to increment a count, may be more streamlined and computationally efficient than performing an entire sequence of computational operations and generating a new notification message for display.

Furthermore, the computer management system described herein solves technical problems by assigning different roles to different users with respect to a particular task set. For example, rather than display the same information to different users and ask the users to volunteer for managing tasks, the computer management system may select one or more of the users for roles related to handling the tasks based on various factors relating to suitability of the users to the tasks. After assigning one or more of the users to roles, the computer management system may differentiate the information displayed to the different assigned users based on the roles. For example, a first notification message generated for display to a first user designated as the primary user to handle a task set may be different than a second notification message generated for display to a second user designated as the secondary user to handle the task set as a fallback to the first user. The first notification message may identify the issues in the task set, including the affected computer devices, and prompt the primary user to affirm a collective remedial action to address the issues. The second notification message may identify the issues in the task set and also identify the primary user. The second notification message may prompt the secondary user to voluntarily assume responsibility for handling the task set instead of the first user.

FIG. 1 is a block diagram of a computer task management system 100 according to an embodiment. The computer task management system 100 includes a system controller 102 that performs computer task management operations described herein. Such operations include compiling issues into a task set having a collective remedial action, assigning the task set to appropriate users for addressing the task set, and performing the collective remedial action on corresponding computer devices. The computer task management system 100 (referred to herein as computer management system) also includes user computer devices 104 (referred to herein as user devices). The user devices 104 may be associated with different users. In an example, the users are human people. The users may be affiliated with a company, a government organization, an educational institution, or the like. In an example, the users may include information technology (IT) professionals, such as IT professionals employed by a company that is contracted to monitor the group 106 of computer devices 108. The user devices 104 may be associated with different users by being owned by different corresponding users, being assigned to different corresponding users, being operated by different corresponding users, and/or the like. For example, a first user device 104 may be a general user device that is only associated with a first user in response to the first user providing unique identifying credentials to access and operate the first user device 104.

The system controller 102 is communicatively connected to the user devices 104. For example, the system controller 102 may be communicatively connected to the user devices 104 via a network 110. The network 110 may be the Internet, a local area network (LAN), or the like. The components in the network 110 may be communicatively connected to each other via wired and/or wireless communication links to permit the transmission of information in the form of signals.

The computer management system 100 may monitor a group 106 of computer devices 108 (e.g., monitored computer devices). For example, the computer management system 100 may monitor the computer devices 108 to keep the computer devices 108 operating with limited interruption. The computer devices 108 may be computers, servers, and/or the like. At least some of the computer devices 108 may be used to provide cloud computing and/or cloud data storage services. The computer devices 108 may be arranged in different clusters 109 based on location, use, type of computer device, and/or the like For example, the computer devices 108 may be located at different data centers. A first cluster 109a of the computer devices 108 may be located at a first data center, a second cluster 109b may be located at a second data center, and a third cluster 109c may be located at a third data center. The different data centers may be in different rooms of a common building, in different buildings in the same city, or in different cities. The computer devices 108 in the group 106 may be communicatively connected to each other and to the computer management system 100 via the network 110.

The computer management system 100 may be responsible for tracking the operating lifetimes, cycles, run time, and/or the like of the computer devices 108 and components thereof. The computer management system 100 may determine when to replace individual computer devices 108 and/or hardware components thereof in an attempt to avoid unexpected faults that interrupt operation. The computer management system 100 may also determine when to update software and/or firmware installed on the computer devices 108 to keep the computer devices 108 up-to-date. In an example, the computer management system 100 may also determine when to renew warranties which cover the computer devices 108 as well as software and/or firmware installed thereon, before the warranties expire. In an example, the computer management system 100 may collect performance data related to the operating performance of the computer devices 108 and sensor measurements related to the condition of the computer devices 108. The computer management system 100 may monitor the performance data and sensor measurements over time to determine trends that the system 100 may use to predict the likelihood of faults (e.g., operating interruptions) at a future time. The computer management system 100 may generate notification messages to inform appropriate users about the detected existence of, or predicted risk of, an issue which interrupts operation of the computer devices 108.

The system controller 102 represents hardware circuitry that includes and/or is connected with one or more processors 112 (e.g., one or more microprocessors, integrated circuits, microcontrollers, field programmable gate arrays, etc.). The system controller 102 includes and/or is connected with a tangible and non-transitory computer-readable storage medium, referred to herein as memory 114. The memory 114 may store programmed instructions (e.g., software) that are executed by the one or more processors 112 to perform the task management operations described herein. For example, the programmed instructions may be utilized by the one or more processors 112 to detect and analyze an issue regarding a first computer device 108 in the group 106 of monitored computer devices 108. The programmed instructions may be utilized by the one or more processors 112 to determine a remedial action to address the issue. The issue and the remedial action constitute a first task item. The programmed instructions may be utilized by the one or more processors 112 to group the first task item with a plurality of task items associated with other computer devices 108 in the group 106 to compile a task set. The one or more processors 112 may compile the task set based on a common remedial action and/or a shared location of the computer devices that are associated with the task set. The programmed instructions may be utilized by the one or more processors 112 to assign the task set to a first user of multiple different users for managing the task set. The programmed instructions may be utilized by the one or more processors 112 to generate a notification message for presentation on a display device 116 of at least one of the user devices 104. The notification message may include graphical content that describes a collective remedial action to address the task set. The one or more processors 112 may generate the notification message to prompt the assigned user to affirm the collective remedial action.

The user devices 104 enable the users to interact with the computer management system 100. Example user devices 104 may include smartphones, tablet computers, laptop computers, hands-free digital assistant devices, desktop computers, wearable computers, computer workstations, and/or the like. The user devices 104 may include a display device 116, one or more processors 118, a tangible and non-transitory computer-readable storage medium, referred to herein as memory 120, and a user input device 122. These components may be commonly held within or on a housing or case of the respective user device 104. Each user device 104 may have additional components that are not shown in FIG. 1, such as communication circuitry for communicating with the system controller 102 through the network 110.

The one or more processors 118 may include one or more microprocessors, integrated circuits, microcontrollers, field programmable gate arrays, and/or the like. The memory 120 may store programmed instructions (e.g., software) that are executed by the one or more processors 118 to perform tasks described herein, such as presentation of notification messages on the display device 116 for observation by the user. The display device 116 includes a display screen that presents graphical content, such as images, shapes, text and symbols, for observation. The display screen may be an LCD screen or the like. The display device 116 also includes hardware and software components used to display graphical content on the display screen. For example, the display screen may be illuminated by an array of light emitting elements of the display device 116. The light emitting elements may be controlled by a graphical processing unit (GPU) of the display device 116.

The display device 116 may display a graphical user interface (GUI) of a program (e.g., application) or website. The system controller 102 may generate notification messages that are communicated to one or more of the user devices 104 and used to present graphical content on the display device 116 to alert and inform the associated user. The notification messages relate to task sets for managing the group 106 of monitored computer devices 108.

The user input device 122 may include one or more devices for providing user input selections, such as a touch screen, a touchpad, a keyboard, buttons, a dial, a microphone, and the like. A user may use the input device 122 to generate user input selections that are communicated from the user device 104 to the system controller 102. The user may provide a user input selection by clicking a mouse button, tapping a touch screen or pad, or the like. The input device 122 may generate an electrical signal in response to receiving the physical touch interaction from the user. The electrical signal may be transmitted to the system controller 102. The user may provide a user input selection to, for example, affirm a collective remedial action provided in a notification message. In another example, the user input device 122 may include a microphone or other audio input device that receives audio commands from the user. The user input device 122 may include a transducer that converts the audio commands to electrical signals to be transmitted to the system controller 102. In this example, the user may audibly provide the user input selection to affirm a collective remedial action to address a task set.

In an example, the memory 120 of the user device 104 may store a management application 124 which is specific to the computer management system 100. For example, a user may selectively activate or "open" the management application 124 on the user device 104 to interact with the computer management system 100 (e.g., the system controller 102). The management application 124 may include a graphical user interface (GUI) that is displayed on the display screen when the management application 124 is active. The GUI may provide notification messages to the user about task items and task sets. The GUI may enable the user to submit user input selections via the input device 122. For example, the GUI may present a virtual button. A user operating one of the user devices 104 may utilize the management application 124 to selectively affirm a remedial action by providing a user input selection on the virtual button.

The system controller 102 is a computer device or a portion of a computer device. For example, the system controller 102 may be part of a server. The system controller 102 is illustrated in FIG. 1 as discrete and separate from the user devices 104 and the monitored computer devices 108. In another example, the system controller 102 may be part of one of the user devices 104.

Figure 2:
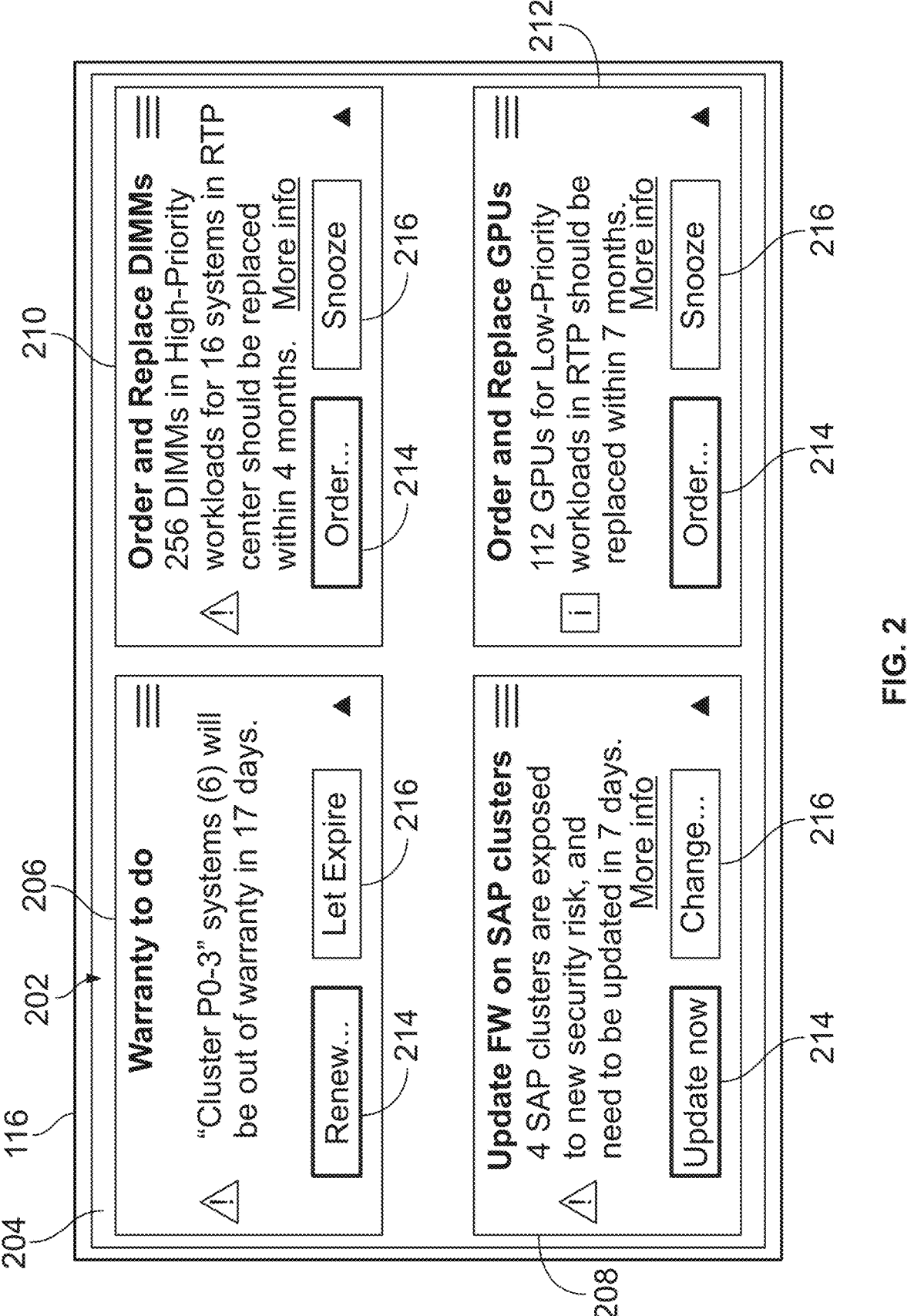
FIG. 2 illustrates a graphical user interface (GUI) on a display device of a user device according to an embodiment.

FIG. 2 illustrates a GUI 202 on a display device 116 of a user device 104 according to an embodiment. The GUI 202 presents graphical content generated by the system controller 102 of the computer management system 100. For example, the graphical content of the GUI 202 is based on a notification message generated by the system controller 102. The notification message is transmitted from the system controller 102 to the display device 116 for presenting the GUI 202 on the screen 204 of the display device 116.

In the illustrated embodiment, the notification message identifies four different task sets. For example, the GUI 202 includes a first task set window 206, a second task set window 208, a third task set window 210, and a fourth task set window 212. The first task set window 206 describes a first task set, the second task set window 208 describes a second task set, the third task set window 210 describes a third task set, and the fourth task set window 212 describes a fourth task set. Each task set represents a compiled group of individual task items. The task sets are compiled by the system controller 102.

Each task set has an issue relating to multiple computer devices 108 in the group 106 that is being monitored. For example, the issue in the first task set is that several computer devices 108 have expiring warranties (e.g., the warranty expiration date is approaching within a designated number of days). More specifically, six computer devices 108 in the group 106 are determined to have warranties that expire in 17 days. The issue in the second task set is that several computer devices 108 need a firmware update. More specifically, the four clusters of the computer devices 108 need a firmware update in seven days due to exposure to a security risk. The issue in the third task set is that a first component of multiple computer devices 108 needs to be replaced within a designated amount of time. For example, a data storage device in 16 computer devices 108 should be replaced within four months. The data storage device in an example is a dual in-line memory module (DIMM). The issue in the fourth task set is that a second component of multiple computer devices 108 should be replaced within seven months. The second component in an example is a graphics processing unit (GPU). Different task sets may be associated with different subsets of the monitored computer devices 108. For example, the six computer devices in the first task set may be at least partially different than the 16 computer devices in the third task set. It is possible that some computer devices 108 may be within more than one task set. It is also possible that there is no overlap in the computer devices 108 associated with the different task sets described in the notification message. The computer devices 108 in the task sets are compiled based on one or more factors, such as shared remedial action to address the issue and shared locations of the computer devices 108.

The system controller 102 generates the notification message so that each of the task set windows 206, 208, 210, 212 identifies the issue and provides a brief description of the set of tasks. The brief description may identify the affected computer devices 108 of the group 106, provide an explanation of the issue affecting the computer devices 108, and describe a collective remedial action for addressing the issue on the affected computer devices 108. The brief description may also provide a time period in which to perform the collective remedial action. For example, the first task set window 206 in FIG. 1 states that the first task set relates to warranties. The brief description identifies six computer devices 108 that are out of warranty in 17 days.

The system controller 102 generates the notification message to include graphical content that describes a collective remedial action to address the issue in each task set. For example, the collective remedial action to address the expiring warranties of the first task set is to renew the warranties of the six affected computer devices 108. The collective remedial action to address the four clusters of computer devices 108 exposed to a security risk in the second task set is to update the firmware of the affected computer devices 108. In the third task set, the collective remedial action is to order and replace the DIMMs on the 16 affected computer devices 108. The collective remedial action in the fourth task set is to order and replace the GPUs on the 112 affected computer devices 108.

In an example, the system controller 102 generates the notification message to prompt a user to affirm the collective remedial action of each task set. The user may affirm the collective remedial action via the user input device 122. In an example, the graphical content of the notification message includes a virtual button 214 associated with the collective remedial action. The virtual button 214 is provided in the task set windows 206, 208, 210, 212. For example, the virtual button 214 may be displayed below the brief description of the task set. The user may affirm the collective remedial action by using the input device 122 to select the virtual button 214. For example, the user viewing the display device 116 may tap the touch-sensitive screen 204 at a location of the virtual button 214 to indicate affirmance of the collective remedial action. In another example, the user may manipulate a mouse or other device to move a cursor over the virtual button 214 and then select the virtual button 214. The virtual button 214 in the first task set window 206 states "Renew," to renew the warranties of the affected computer devices 108 in the first task set. The virtual button 214 in the second task set window 208 states "Update now" to signal updating the firmware of the affected computer devices 108 in the second task set. The virtual button 214 in the third and fourth task set windows 210, 212 state "Order" to signal ordering the new corresponding components for the affected computer devices in the third and fourth task sets.

In an example, the virtual button 214 for affirming the collective remedial action is not the only virtual button displayed in the task set window. The virtual button 214 is referred to herein as an affirmance button 214. The graphical content of the notification message may also include a virtual button 216 referred to herein as a modification button 216. The modification button 216 is provided to enable a user to postpone and/or modify the collective remedial action that is suggested. For example, the modification button 216 in the first task window 206 allows the user to let the warranties for the six affect computer devices 108 expire without renewing. The modification button 216 in the second task window 208 allows the user to change the update schedule. The modification buttons 216 in the third and fourth task windows 210, 212 allow the user to postpone ordering the replacement parts.

The system controller 102 intelligently compiles multiple different task items into task sets. For example, the system controller 102 detects various computer issues over time. The computer issues relate to the group 106 of monitored computer devices 108. The computer issues can include expiring warranties, outdated software, outdated firmware, defective hardware components, hardware components approaching the end of designated operating lifetimes for the hardware components, and/or the like. Other issues that can be detected may involve computer conditions, such as high temperature, high power usage, and/or the like. The system controller 102 may detect the issues via receipt of messages from other devices, receipt of sensor signals, and/or scheduled alarms (e.g., using an integrated clock device).

For example, the computer devices 108 themselves, as well as individual components installed in the computer devices 108, may have designated operating lifetimes. The designated operating lifetimes refer to a predicted period of time that the components will be consistently operational before the components should be replaced. The designated operating lifetimes may be determined by manufacturers of the hardware components. The system controller 102 may set alarms to detect when the designated operating lifetimes reach the respective ends. The system controller 102 may also set alarms for tracking the expiration of warranty periods.

The system controller 102 may detect an issue when current software and/or firmware in a computer device 108 is determined to be outdated and/or a software update and/or firmware update is available for installation. For example, the system controller 102 may receive a message that indicates that an update is available. The system controller 102 may also detect an issue in response to determining that a component is defective (e.g., malfunctioning) and therefore should be replaced. For example, the system controller 102 may receive and monitor sensor signals indicating the conditions of various components of the monitored computer devices 108. The system controller 102 may detect that a first component is defective when the temperature of the first component is outside of an expected temperature range for that first component during normal operating conditions. In another example, the system controller 102 may detect that a second component is defective in response to an output power or signal generated by the second component being outside of an expected power range or an expected signal range. The signal range may be frequency, amplitude, or the like.

In response to detecting an issue, the system controller 102 determines a remedial action to address the issue. The remedial action may be determined based on the type or category of the issue. For example, if the issue is that a first component is defective, then the system controller 102 may determine, as the remedial action, that the first component should be replaced with new hardware. In another example, if the issue is that the warranty of the computer device 108 is expiring, the system controller 102 may determine, as the remedial action, to renew the warranty. If the issue is that software of a computer device 108 is outdated, the remedial action determined by the system controller 102 may be to update the software. The same is true for outdated firmware. In another example, if the issue is that a hardware component is approaching the end of its designated operating lifetime, the system controller 102 may determine to replace, or at least schedule replacement of, the hardware component prior to the hardware component experiencing a fault. The remedial actions are determined by the system controller 102 as actions that can be performed to reduce the risk that the group 106 of monitored computer devices 108 experience an interruption in service. The system controller 102 determines the remedial actions to avoid or limit downtime in which the computer devices 108 are not operating.

In the examples above, the individual issues and associated remedial actions to address and resolve the issues constitute respective task items. For example, a first task item may be to perform a first remedial action to resolve a first issue regarding a first computer device 108 in the group 106 of monitored computer devices 108. Each task item is related to a single one of the monitored computer devices 108.

The system controller 102 of the computer management system 100 described herein intelligently compiles task items into task sets. The compiling of task sets may provide the technical benefit of reducing the computational workload and energy expenditure of the computer management system 100, relative to treating all task items separately or grouping the task items in a different way. For example, the system controller 102 may be able to avoid some redundant operations by handling multiple related task items collectively as a task set. The system controller 102 generates the notification message to display and describe each task set, rather than each individual task item. The GUI 202 depicting the task set windows 206, 208, 210, 212 may be more organized and intuitive than GUIs depicting a plurality of individual task items. As a result, it may be easier for the user viewing the screen 204 to visualize and comprehend the information that is presented.

In an example, the system controller 102 groups task items to compile a task set. The system controller 102 may group a first task item associated with a first computer device 108 with a plurality of other task items associated with other computer devices 108 in the group 106 to form a task set. The first task item may be compiled with the other task items based on a common remedial action and/or a shared location of the computer devices 108 associated with the task set. Upon determining a first remedial action to address the issue in the first task item, the system controller 102 may compare the first remedial action to remedial actions of other task items and/or existing task sets.

In an example, if the first remedial action is to update software on the first computer device 108, the system controller may analyze existing task items and task sets to search for other tasks that call for updating the same software. The system controller 102 may determine that multiple computer devices 108 in the group 106 have the same software that needs to be updated. In response, the system controller 102 may group the task items to compile a task set. The task set in this example may have a collective remedial action to update the software on all of the computer devices 108 associated with the task set. For example, if the task set is associated with ten computer devices 108, the collective remedial action may be to update the specific software program on all ten devices 108.

The system controller 102 may compile task items based on shared locations of the computer devices 108 at issue. For example, if a first task item relates to a first computer device 108 in the group 108, the system controller 102 may analyze existing task items and task sets to search for other tasks that are associated with computer devices 108 in the group 106 located in a shared location with the first computer device 108. The shared location may refer to a city, a compound, a facility, a building, a floor (e.g., level), a room, or the like. The facility and/or building may be a data center. As shown in FIG. 1, the computer devices 108 may be arranged in different clusters 109. The computer devices 108 in a common cluster 109 may be located in a shared location. In an example, the system controller 102 may group task items to compile a task set when the computer devices 108 associated with the task items are in the shared location. Forming task sets based on geographic location may be useful for assigning a single user to manage all of the issues in the task set. For example, the assigned user may be able to inspect each of the computer devices 108 associated with the task set based on the proximity of the computer devices 108 to each other. In this example, the user assigned to the task set does not have to manage multiple computer devices 108 located in different data centers, cities, or the like.

In an example, the system controller 102 may compile task sets based on a combination of factors. For example, the system controller 102 may compile a first task set based on both a common remedial action and a shared location of the computer devices 108 associated with the first task set. The first task set may include task items that are associated with computer devices 108 that are located in the same facility and that have the same remedial action. For example, the first task set may have a collective remedial action to replace a data storage device that is installed in each of multiple computer devices 108 located in a first data center. The first task set in this example does not include computer devices 108 located outside of the first data center, even if those computer devices 108 have the same type of data storage device. Furthermore, the first task set may not include replacing other types of data storage devices installed on other computer devices 108 in the first data center. As a consequence, the first task set may only include task items that share the same remedial action and location of the associated computer devices 108.

A shared remedial action is referred to herein as a collective remedial action. For example, the collective remedial action is a single action (e.g., update software program "X") that can be performed for each of the monitored computer devices 108 associated with the task set to resolve the task set. Example collective remedial actions for different task sets may include renewing a warranty, updating software, updating firmware, replacing a defective component, replacing a component reaching the end of its designated operating lifetime, and/or the like.

After compiling the task items into a task set, the system controller 102 generates a notification message for presentation on the display device 116 of at least one user device 104. The notification message includes graphical content, as shown in FIG. 2, that identifies the task set and describes the collective remedial action for addressing the task set. The notification message optionally may identify and describe multiple different task sets that are then displayed next to one another on the GUI 202. For example, a single notification message may describe all four of the task sets shown in FIG. 2. Alternatively, the system controller 102 may generate a different notification message for each task set. The user computer device 104 may receive the different notification messages and generate the GUI 202 to concurrently display the graphical content describing all of the task sets in the different task set windows 206, 208, 210, 212.

In an example, the system controller 102 may differentiate the notification messages that are communicated to different user devices 104 based on roles assigned to users associated with the user devices 104. The system controller 102 may assign a given task set to one specific user of multiple different users for that assigned user to manage the task set. The assigned user to handle the task set is referred to herein as a primary user. The primary user has the primary role in addressing the task set. The primary user may manage the task set by resolving the issues in the task set.

For example, the primary user may resolve the issues by affirming the collective remedial action that is presented by the system controller 102 in the notification message. After the system controller 102 receives an indication that the primary user affirmed the collective remedial action, the system controller 102 may perform the collective remedial action for the computer devices 108 associated with the task set. The primary user may affirm the collective remedial action via manipulating the user input device 122 to generate an input selection signal indicating selection of the affirmance button 214 on the GUI 202. The input selection signal is communicated to the system controller 102. In response to receiving the input selection signal, the system controller 102 may perform the collective remedial action by updating the applicable software and/or firmware on the computer devices 108 in the task set, ordering the applicable replacement components to be installed on the computer devices 108 in the task set, renewing the applicable warranty for the computer devices 108 in the task set, and/or the like. In another example, the primary user may delay affirming the collective remedial action, or simply refuse to accept the collective remedial action, by selecting the modification button 216 in the GUI 202 via the user input device 122.

The system controller 102 may differentiate the notification messages so that the graphical content presented on the display device 116 of a first user device 104 associated with the primary user differs from the graphical content presented on the display device 116 of a second user device 104 associated with another user. For example, the display device 116 shown in FIG. 2 may be specifically associated with a first user assigned as primary user in the four task sets shown. The first user may uniquely control, own, and/or operate the user device 104 that includes the display device 116 shown in FIG. 2, at least while the computer management system 100 is active on the user device 104. The system controller 102 may assign users to different roles with respect to the management of different task sets. The system controller 102 may alter at least some of the graphical content that is displayed on the GUI 202 to a primary user via a first user device from the graphical content that is displayed on the GUI 202 to a secondary user via a second user device. The system controller 102 may differentiate the content to provide concise, relevant, role-specific information. As a result, some user devices 104 may display at least some different information and options on the GUI 202 than other user devices 104.

In an example, the system controller 102 may assign some of the users to roles for managing a given task set based on an analysis of multiple factors. The factors are selected as a means to quantitatively compare multiple users' fitness or appropriateness for managing the given task set. Some example factors may include (i) competency of the user in performing the collective remedial action, (ii) accessibility of the user to the computer devices associated with the task set, (iii) physical proximity of the user to the computer devices associated with the task set, (iv) availability of the user to perform the collective remedial action within a designated time period, and/or the like.

The competency of the user refers to the skill and experience level of the user with respect to the type of collective remedial action suggested. For example, a user with a high competency has performed a number of similar remedial actions in the past and/or has completed sufficient training to perform similar remedial actions. The user with high competency has developed skills due to the experience and/or training obtained, so the user predictably will be able to successfully perform the collective remedial action.

The accessibility of the user to the computer devices associated with the task set may refer to the ability of the user to gain access to the relevant computer devices 108. For example, the collective remedial action may require the user that approves the collective remedial action to have satisfactory credentials for making changes to the computer devices 108. For example, a first collective remedial action may require the decision-making user to establish an upper-level authority position before permitting the user to approve the collective remedial action. The first collective remedial action may involve renewing the warranty on a set of computer devices 108. If the assigned user has an upper-level authority position, then the assigned user would have access to the computer devices 108 associated with the task set. The user may establish the identity and authority level of the user by inputting unique user credentials into the corresponding user device 104. For example, the user may input the credentials into the management application (e.g., program) 124 using the input device 122. A user that meets the requirements for gaining access to all of the computer devices 108 associated with the task set may score well in the accessibility factor. A user that does not meet the requirements for gaining access to the relevant computer devices 108 may score poorly in the accessibility factor.

The physical proximity of the user to the computer devices associated with the task set refers to the distance between the physical location of the user and the physical location of the computer devices 108 associated with the task set. For example, a first user that is within or near a data center that contains the relevant computer devices 108 would be more proximate to the computer devices 108 than a second user in another city. The first user may be able to address the issues by performing the collective remedial action before the second user would be able to do so. The early intervention may reduce the risk of, or at least the negative effect of, an operating interruption of the computer devices 108. The first user that is closer to the affected computer devices 108 may score higher in the physical proximity factor than the second user.

The availability of the user to perform the collective remedial action within a designated time period accounts for the schedules and conditions of the prospective users. For example, a first user may be out of town, and therefore unavailable, to perform a collective remedial action of replacing a defective hardware component in the relevant computer devices 108. That first user would score lower in the availability factor than a second user that has earlier availability to replace the defective hardware component. The availability may also account for scheduling conflicts, illness that could render the user unavailable, and/or the like. For example, a third user may have a booked schedule for over a week. That third user may score lower in the availability factor than a fourth user that has an earlier time window for addressing the task set.

In an example, the system controller 102 may compare a pool of multiple different prospective users to one another with respect to multiple factors to assign one or more roles among the users. The prospective users could be employees of an IT company, or the like. The one or more roles that are assigned may be the primary (or assigned) user, a secondary user, a tertiary user, and/or the like. The secondary user is a backup to the primary user. The tertiary user is a backup to the primary user and the secondary user. The system controller 102 may compare the users among at least two factors, such as at least two of the four factors described above. In an example, the system controller 102 may compare the users among three or all four of the factors described above.

The system controller 102 may determine a weighted score for at least some of the prospective users based on weight values assigned to the different users with respect to the multiple factors. The weighted score reflects the appropriateness of the respective user for managing a given task set. The system controller 102 may then assign the task set to one or more of the users based on a comparison of the weighted scores of the prospective users. For example, the system controller 102 may compare the weighted score of a first user, with respect to a first task set, to the weighted scores of other users. The system controller 102 may assign the first user as the primary user for handling the task set in response to determining that the weighted score of the first user is greater than the weighted scores of the other users. The system controller 102 may perform a similar analysis and comparison for each task set. For example, the weighted scores are specific to both the user and the task set (e.g., the collective remedial action). A given user may have two different weighted scores with respect to two different task sets because the user may be more qualified or appropriate to handle one of the task sets over the other task set.

Figures 3, 4:
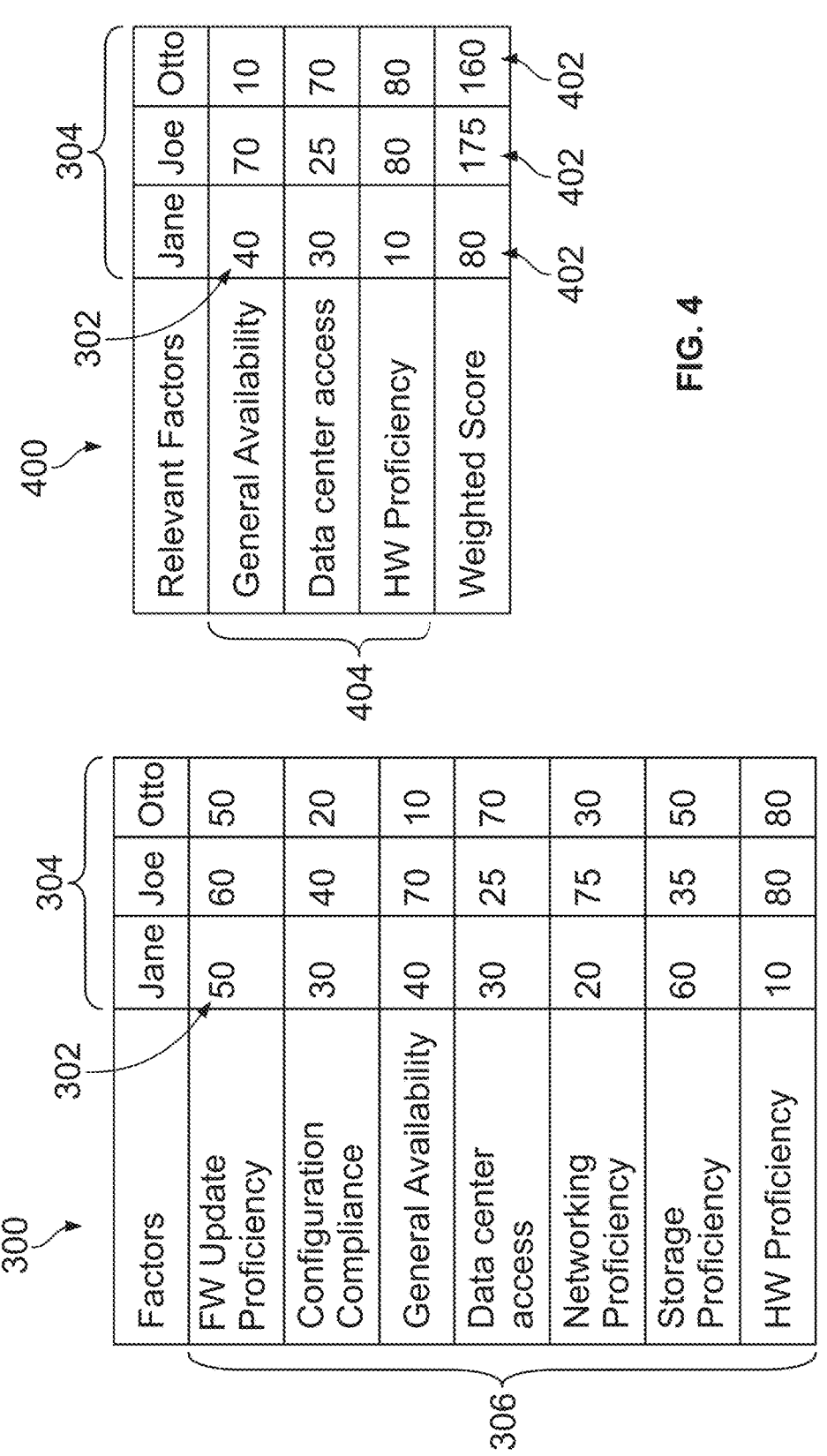
FIG. 3 is a chart that lists weight values assigned to three different users based on multiple different factors according to an embodiment.
FIG. 4 is a task-specific chart that provides weighted scores for each of the three prospective users shown in FIG. 3.

FIG. 3 is a chart 300 that lists weight values 302 assigned to three different users 304 based on multiple different factors 306 according to an embodiment. The chart 300 is referred to herein as a scoring rubric 300. The scoring rubric 300 may be stored in the memory 114 of the system controller 102. The system controller 102 (e.g., the processor(s) 112 thereof) may access and refer to the scoring rubric 300 to determine a weight score of each of the users with respect to a given task set. The information in the illustrated scoring rubric 300 is merely provided for example. The system controller 102 may refer to a scoring rubric that has different information (e.g., different factors) in other examples. In FIG. 3, the three users 304 are identified as "Jane," "Joe," and "Otto." The factors 306 listed are firmware update proficiency, configuration compliance, general availability, data center access, networking proficiency, storage proficiency, and hardware proficiency. These factors are not specific to any one task set. The system controller 102 may refer to this scoring rubric 300 to determine the weighted scores, which are specific to a given task set. The firmware update proficiency, configuration compliance, networking proficiency, storage proficiency, and hardware proficiency factors fall within the competency category described above. The general availability factor falls within the availability category described above. The data center access factor falls within the accessibility category described above.

Each user 304 is assigned a weight value 302 for each of the factors 306 listed in the scoring rubric 300. The weight values 302 in the illustrated example are numerical integers in the range from 0 to 100. The end value 0 represents that the user cannot do the task (e.g., cannot perform the collective remedial action). The end value 100 represents that the user is excellent at performing the task. The median value 50 represents that the user is average at performing the task. In an example, the weight values 302 indicate that Joe is more available than Jane and Otto, and Jane is more available than Otto.

FIG. 4 is a task-specific chart 400 that provides weighted scores 402 for each of the three prospective users 304 shown in FIG. 3. The chart 400 may be specific to a task set that includes ordering and replacing a hardware component on monitored computer devices 108 as the collective remedial action. The chart 400 may be generated by the system controller 102. The system controller 102 may determine a subset of relevant factors 404 from the factors 306 shown in FIG. 3. The relevant factors 404 may be factors that are determined to be useful for selecting a user to perform and/or manage the given task set. For example, the relevant factors 404 may be relevant to the collective remedial action to address the task set. For a task set relating to replacing a hardware component, the system controller 102 may determine that the relevant factors 404 include the general availability of the users, the data center access, and the hardware proficiency. The affected computer devices 108 that require the replacement part(s) may be located in the data center, so access to the data center may be relevant. Only three factors are shown in FIG. 4, but the system controller 102 may compare more than three factors to determine the roles of the users in another example. For example, the system controller 102 may also factor the proximity of the users to the affected computer devices 108.

The system controller 102 may determine the weighted scores 402 for the prospective users based on the weight values 302 assigned to each user in the relevant factors 404. For example, the system controller 102 may aggregate the weight values 302 of the relevant factors 404 for each individual user 304 to generate the weighted score 402 for that user with respect to the task set at issue. In FIG. 4, the weighted score 402 for Jane is "80," which is the sum of the individual weight values 302 having numerical values "40," "30," and "10." For the example task set associated with the chart 400 shown in FIG. 4, the user "Joe" has the greatest weighted score 402 of the three prospective users, and the user "Jane" has the lowest weighted score 402. These values indicate that Joe is determined to be the most appropriate user for managing the task set (out of the three analyzed users). The system controller 102 may assign Joe as the primary user, Otto as a secondary user, and Jane as a tertiary user for managing the specific task set. The system controller 102 assigns Joe as the primary user because the system controller 102 predicts that Joe has the greatest likelihood of accurately and effectively resolving the task set. In another example, the weight values may be scored differently to produce weighted scores, but the system controller 102 still compares the weighted scores to select the primary user and optionally at least one backup role.

Figure 5:
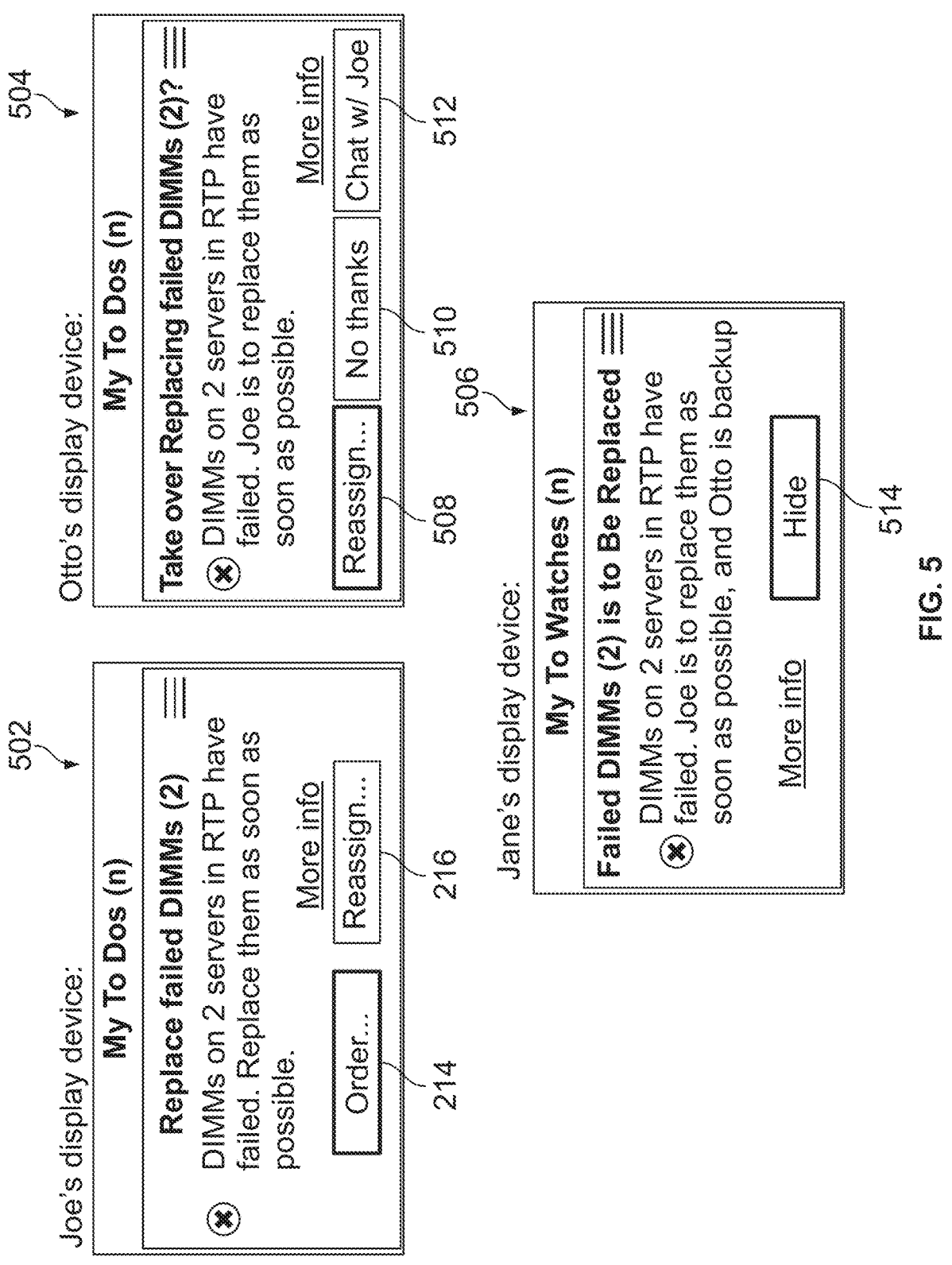
FIG. 5 illustrates a first notification message for presentation on a first display device to a primary user, a second notification message for presentation on a second display device to a secondary user, and a third notification message for presentation on a third display device to a tertiary user.

FIG. 5 illustrates a first notification message 502 for presentation on a first display device to a primary user, a second notification message 504 for presentation on a second display device to a secondary user, and a third notification message 506 for presentation on a third display device to a tertiary user. The three notification messages 502, 504, 506 refer to the same task set. The task set relates to failed data storage devices, more specifically DIMMs, on two servers in a data center. The collective remedial action is to replace the DIMMs by ordering and installing new hardware DIMM components in the affected servers. As in the example described in FIG. 4, the primary user is Joe, the secondary user is Otto, and the tertiary user is Jane. In an example, the system controller 102 may generate the notification messages to differentiate the information that is presented to users assigned to different roles, even with respect to the same task set. For example, the first notification message 502 for the primary user is not identical to the second notification message 504 or the third notification message 506.

The first notification message 502 includes graphical content that describes the collective remedial action to address the task set. The graphical content is alphanumeric text identifying the task set as replacing two failed DIMMs. The task set is formed by compiling two individual task items for each of the two servers in which the DIMMs failed. The first notification message 502 has graphical content that states that DIMMs on two servers in a data center have failed, and suggests that the user replace the DIMMs as soon as possible. The first notification message 502 prompts the primary user to affirm the collective remedial action, which is to order new DIMMs for the two affected servers. The first notification message 502 has an affirmance virtual button 214. Once the affirmance button 214 is selected by the primary user via the user input device 122, the system controller 102 will order the new DIMMs for shipment to the data center. The first notification message 502 has a modification button 216 which states "Reassign." The primary user may select the modification button 216 to reassign the task set to another user, such as the secondary user.

The system controller 102 generates the second notification message 504 to include graphical content that identifies the primary user. For example, the second notification message 504 may state that "Joe is to replace" the failed DIMMs. The second notification message 504 may prompt the secondary user to take over managing the task set for the primary user. For example, the second notification message 504 may ask the secondary user to "Take over replacing failed DIMMs." The second notification message 504 may include a virtual button 508, referred to herein as a volunteer button 508. The volunteer button 508 allows the secondary user to volunteer to take over as the primary user in place of the user that is assigned to the primary role by the system controller 102. The volunteer button 508 states "Reassign" in FIG. 5. The second notification message 504 in an example may have a dismiss button 510 and/or a chat button 512. The dismiss button 510 allows the secondary user to close or minimize the second notification message 504 on the GUI of the display device so the secondary user does not have to continue to view the second notification message 504. The chat button 512 allows the secondary user to selectively attempt to establish communication with the primary user (e.g., Joe). For example, in response to receiving a user selection signal generated by the input device 122 indicating selection of the chat button 512, the system controller 102 may initiate a communication with the primary user. For example, the system controller 102 may initiate the communication by initiating a live text conversation on the GUI, by initiating a phone call or video call with the primary user, or the like.

The system controller 102 generates the third notification message 506 to include graphical content that identifies the primary user and the secondary user. For example, the third notification message 506 may state that "Joe is to replace [the failed DIMMs on the two servers] as soon as possible, and Otto is backup." The third notification message 506 may be merely informative in nature. For example, the system controller 102 may not prompt or request that the tertiary user take any positive action to respond to the task set. Jane is merely provided with the identification of the users assigned to primary and secondary roles, as well as details about the issue that formed the basis of the task set. The third notification message 506 may include a dismiss button 514 that allows the tertiary user to close or minimize the third notification message 506 on the GUI of the display device so the tertiary user does not have to continue to view the third notification message 506.

Figure 6:
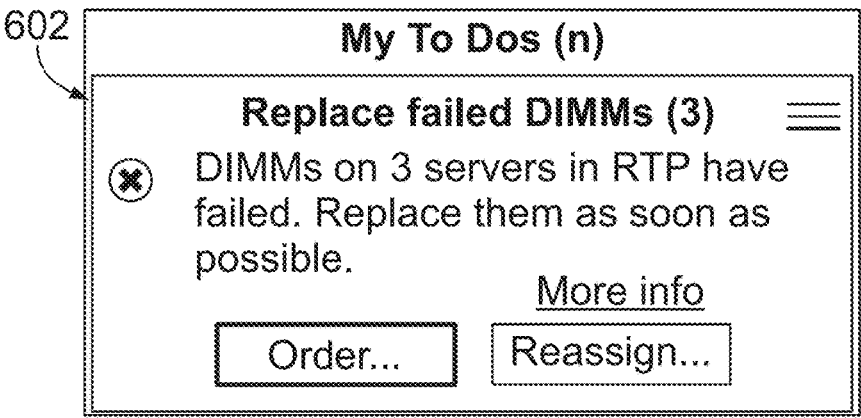
FIG. 6 illustrates an updated notification message for presentation on the first display device to the primary user according to an embodiment.

FIG. 6 illustrates an updated notification message 602 for presentation on the first display device to the primary user according to an embodiment. The updated notification 602 is an updated version of the first notification message 502 shown in FIG. 5. The system controller 102 may generate the updated notification message 602 in response to adding another task item to the task set. For example, the task set relates to replacing failed DIMMs on a subset of the monitored computer devices 108. The system controller 102 may update the notification messages that are displayed to the users in real time as new issues are detected and new task items are compiled into existing task sets.

For example, after generating the notification messages 502, 504, 506, the system controller 102 may detect a new issue regarding another (e.g., a second) computer device 108 in the group 106 of monitored computer devices 108. The system controller 102 may determine a new remedial action to address the new issue. The new issue and the new remedial action constitute a new task item. The system controller 102 may analyze the remedial action to address the new issue and/or the location of the second computer device with respect to the collective remedial actions and/or the locations of the affected computer devices 108 in the existing task sets to determine whether to compile the new task item into an existing task set. If the remedial action of the new task item matches the collective remedial action of one of the existing task sets and/or the second computer device 108 is disposed at the shared location with the computer devices 108 of one of the existing task sets, then the system controller 102 may integrate the new task item into the existing task set. For example, the system controller 102 may integrate the new task item into the first task set described by the first notification message 502 in FIG. 5. The remedial action of the new task item may match the collective remedial action of the first task set and the second computer device 108 associated with the new task item may be at the shared location with the computer devices 108 associated with the first task set.

Upon determining that the new task item can be compiled into the task set, the system controller 102 may update the first notification message 502 to incorporate information about the new task item. For example, the updated notification message 602 may be transmitted to the primary user Joe's display device to replace the first notification message 502. In an example, the system controller 102 may update the notification message by incrementing a count in the graphical content that is displayed. For example, the graphical content of the updated notification message 602 indicates that the DIMMs on three servers in the data center have failed. The prior notification message 502 indicated failed DIMMs on two servers in the data center. The updated notification message 602 increases the count of the affected computer devices 108 from two to three. In response to the primary user Joe affirming the collective remedial action, the system controller 102 may perform the collective remedial action for all three task items (e.g., for all three affected computer devices 108). For example, the system controller 102 may order three replacement DIMMs to be shipped to the data center. Because the three task items are grouped together as one task set, the primary user can address all three task items by selecting the affirm button 214 on the updated notification message 602. For example, a single click of the affirm button 214 may initiate the system controller 102 to take the same type of remedial action for all three affected computer devices 108. The primary user does not have to address each task item individually.

Figure 7:
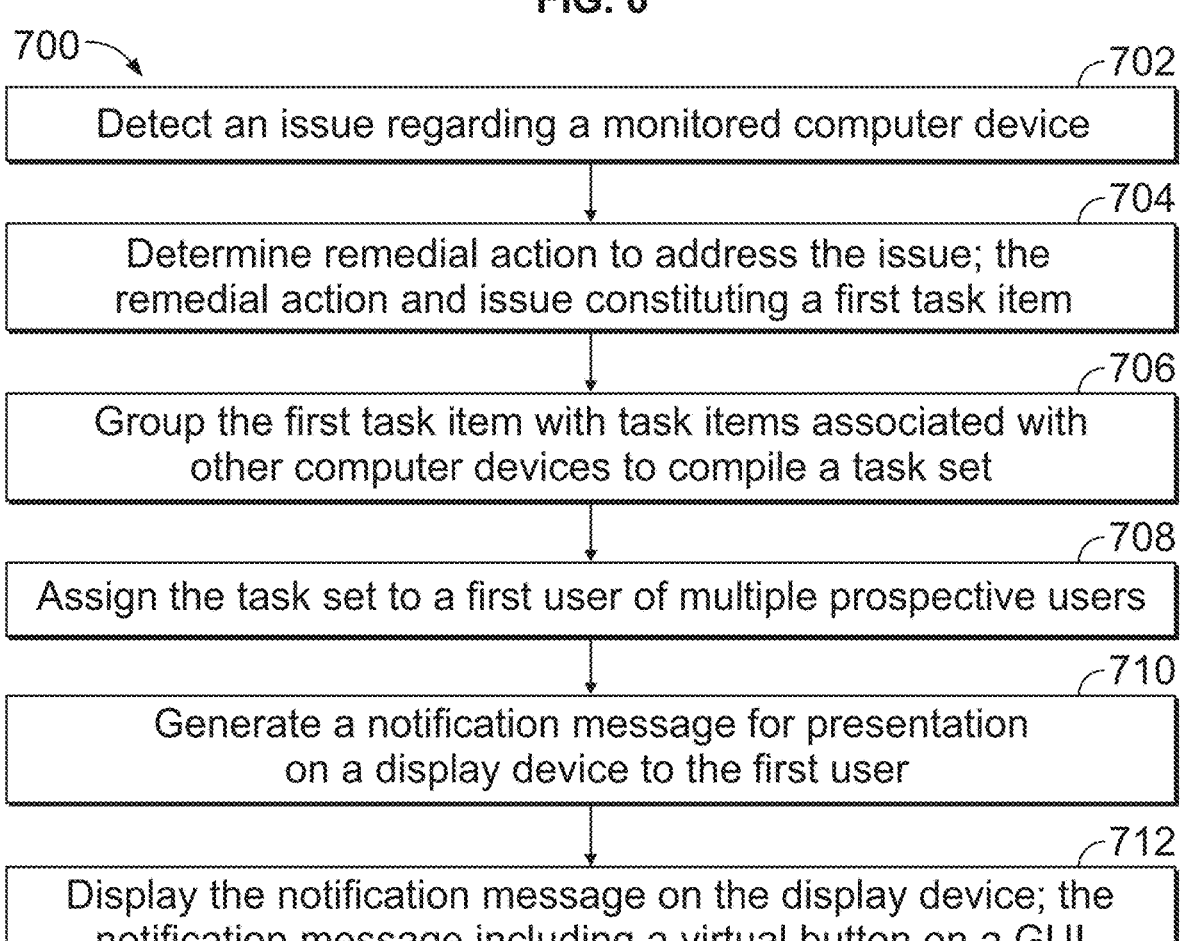
FIG. 7 is a flow chart of a method of managing and monitoring computer devices according to an embodiment.

FIG. 7 is a flow chart of a method of managing and monitoring computer devices according to an embodiment. The method may be performed entirely or in part by the system controller 102 (e.g., the one or more processors 112) of the computer management system 100. The method optionally may include at least one additional step than shown in FIG. 7, at least one fewer step than shown in FIG. 7, and/or at least one different step than shown in FIG. 7.

At step 702, an issue is detected regarding a first computer device 108 in a group 106 of monitored computer devices 108. The issue may be an expiring warranty, outdated software, outdated firmware, a defective hardware component, and/or a hardware component approaching an end of a designated operating lifetime of the hardware component.

At step 704, a remedial action is determined to address the issue. The issue and the remedial action constitute a first task item. The remedial action to address the issue may include renewing the warranty of the first computer device that is expiring, updating the software that is outdated, updating the firmware that is outdated, or ordering at least one hardware component for the first computer device 108 to replace at least one of the defective hardware component or the hardware component that is approaching the end of the designated operating lifetime.

At step 706, the first task item is grouped with task items associated with other computer devices 108 in the group 106 of monitored computer devices 108 to compile a task set. The task set is compiled based on at least one of a common remedial action or a shared location of the computer devices 108 associated with the task set. In an example, the task set is compiled based on both the common remedial action and the shared location of the computer devices 108 associated with the task set.

At step 708, the task set is assigned to a first user of multiple different users for the first user to manage (e.g., resolve) the task set. The task set may be assigned to the first user by comparing the multiple different users with respect to multiple factors. The factors may be used to determine how appropriate each user would be for handling the task set. The factors may include (i) competency in performing the collective remedial action, (ii) accessibility to the computer devices 108 associated with the task set, (iii) proximity to the computer devices 108 associated with the task set, and/or (iv) availability to perform the collective remedial action within a designated time period. The system controller 102 may evaluate the users on multiple factors, such as two, three, or all four of the factors listed. The system controller 102 may determine a weighted score for at least some of the multiple different users based on weight values assigned to the different users with respect to the multiple factors. The system controller 102 may assign the task set to the first user by comparing the weighted score of the first user to the weighted scores of other users in the multiple different users. For example, the system controller 102 may select the first user for having a primary role in response to the weighted score of the first user being greater than the weighted scores of the other users. The greater weighted score may indicate that the first user is more appropriate for managing the task set than the other users.

At step 710, a notification message is generated for presentation on a display device 116. The display device 116 may be associated with a specific user, such as the first user assigned to the primary role. The notification message may include graphical content that describes a collective remedial action to address the task set. The notification message is generated to prompt the first user to affirm the collective remedial action. At step 712, the notification message is displayed on a screen 204 of the display device 116 for viewing by the first user. Generating the notification message may include providing a virtual button 214 on a graphical user interface (GUI) 202. The virtual button 214 may be an affirmance button 214 associated with the collective remedial action of the task set.

At step 714, responsive to receiving an input selection signal generated via a user input device 122 and indicating selection of the virtual button 214, the method may include performing the collective remedial action for the computer devices 108 that are associated with the task set. For example, the system controller 102 may initiate a software or firmware update, may schedule a software or firmware update, may renew a warranty, may order new hardware components, and/or may schedule installation of new hardware components for the affected computer devices 108.

The method may include detecting a new issue regarding a second computer device 108 in the group 106 of monitored computer devices 108 after generating the notification message. The system controller 102 may determine a new remedial action to address the new issue. The new issue and the new remedial action may constitute a new task item. The system controller 102 may update the notification message to incorporate information about the new task item into the task set in response to determining that at least one of: (i) the new remedial action is the common remedial action or (ii) the second computer device is located at the shared location of the computer devices 108 associated with the task set. The system controller 102 may update the notification message to incorporate the information about the new task item by incrementing a count in the graphical content.

The method may include determining a secondary user of the multiple different users. The secondary user may have a weighted score that is second-best, behind the user assigned to the primary role. The method may include generating a second notification message for presentation on a second display device 116 to be viewed by the secondary user. The second notification message may include some different graphical content than the notification message displayed to the primary user. The second notification message may identify the first user and prompt the secondary user to take over managing the task set for the first user. In an example, the method may include determining a tertiary user of the multiple different users. The method may include generating a third notification message for presentation on a third display device 116 to be viewed by the tertiary user. The third notification message may include graphical content that identifies the first user and the secondary user.

In an example, the system controller 102 of the computer management system 100 may include a machine learning algorithm. The machine learning algorithm may be used to determine the remedial action to resolve an issue, to compile multiple task items into a task set, and/or to assign the task set to at least one user for managing the task set. For example, the machine learning algorithm may allows the computer management system 100 to intelligently group task items together into task sets that can be resolved using a collective remedial action.

The machine learning algorithm may include multiple layers of artificial neurons (or nodes) connected with each other by functional relationships or edges (e.g., circuits), which model the synapses in a brain. The layers may include an input layer, an output layer, and one or more intermediate layers referred to as hidden layers. The neurons may be processors and/or functions performed by processors. The functional relationships may be rules (e.g., logic rules), mathematical equations, and/or the like. Each neuron receives signals from connected neurons as inputs. The neuron generates an output that is a non-linear function of the sum of its inputs. The strength of the signal at each connection is determined by a weight, which is adjusted during a learning process. The output of each neuron may be transmitted to other neurons in another layer. The final output of the machine learning algorithm may be used to adjust the weights of the neurons. For example, if the final output is determined to be wrong or inaccurate, then the weights are adjusted to change the relationships between the nodes and reduce the likelihood of yielding the same incorrect output in the future. By this feedback mechanism, the machine learning algorithm may continue to improve over time.

In the computer management system 100, the machine learning algorithm may receive, as inputs, a detected issue, a determined remedial action for addressing the detected issue, a location of the affected computer device, information about existing task sets, and/or information about the pool of prospective users. For example, the information of the existing task sets may include locations of the affected computer devices, remedial actions for the task items in the existing task sets, and the like. The information about the pool of prospective users may include the weight values 302 assigned to the users for the different factors as shown in FIG. 3, current locations of the users, user schedules, the experience level and/or training level of the users, and/or the like. The machine learning algorithm may analyze the input information through the layers of neurons in a forward propagation direction. The machine learning algorithm may apply rules and/or criteria to the information and reach a conclusion in the form of an output. The output of the machine learning algorithm may identify a task set in which the new task item is compiled and/or may identify a first user from the pool of prospective users to act in the primary role.

The system controller 102 (optionally with assistance by a user) may determine that the output is incorrect and/or inaccurate because there is too much error. The system controller 102 may change the rules, weights, and/or criteria in the neurons and synaptic circuits. For example, the system controller 102 may alter the functions performed by some neurons, the synaptic circuit connections between the neurons (e.g., which neurons communicate with which neurons in the neural network), the weights of the signals, and/or the like. Then, the system controller 102 may perform the operation again using the adjusted machine learning algorithm to reach an updated output. The updated output may have less error, and therefore be more correct, than the initial output. The system controller 102 may change the synaptic circuits (e.g., the relationships between the neurons) based on feedback (e.g., error, back propagation, etc.) received from earlier machine learning analysis to reach a more accurate result.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), complex instruction set computer (CISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

In one embodiment, the computer management system may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, SVMs, Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method comprising:

detecting an issue regarding a first computer device in a group of monitored computer devices;

determining, via one or more processors, a remedial action to address the issue, the issue and the remedial action constituting a first task item;

grouping the first task item with task items associated with other computer devices in the group of the monitored computer devices to compile a task set, wherein the task set is compiled based on both a common remedial action and a shared location of the other computer devices associated with the task set;

assigning the task set to a first user of multiple different users for managing the task set; and generating, via the one or more processors, a notification message for presentation on a display device, the notification message including graphical content comprising a virtual button that describes a collective remedial action to address the task set, wherein the notification message is generated to prompt the first user to affirm the collective remedial action, and wherein the one or more processors automatically perform the collective remedial action for the other computer devices associated with the task set without requiring per-device selection.

2. The method of claim 1, wherein assigning the task set to the first user comprises comparing the multiple different users with respect to multiple factors, the multiple factors comprising at least two of: (i) competency in performing the collective remedial action, (ii) accessibility to the other computer devices associated with the task set, (iii) proximity to the other computer devices associated with the task set, or (iv) availability to perform the collective remedial action within a designated time period.

3. The method of claim 2, further comprising:

determining a weighted score for at least some of the multiple different users based on weight values assigned to the multiple different users with respect to the multiple factors; and wherein assigning the task set to the first user comprises comparing the weighted score of the first user to the weighted scores of other users in the multiple different users.

4. The method of claim 1, further comprising:

determining a secondary user of the multiple different users;

generating a second notification message for presentation on a second display device, the second notification message including graphical content that identifies the first user and prompts the secondary user to take over managing the task set for the first user;

determining a tertiary user of the multiple different users; and generating a third notification message for presentation on a third display device, the third notification message including graphical content that identifies the first user and the secondary user.

5. The method of claim 1, further comprising:

detecting a new issue regarding a second computer device in the group of the monitored computer devices after generating the notification message;

determining, via the one or more processors, a new remedial action to address the new issue, the new issue and the new remedial action constituting a new task item; and updating the notification message to incorporate information about the new task item into the task set in response to determining that at least one of: (i) the new remedial action is the common remedial action or (ii) the second computer device is located at the shared location of the other computer devices associated with the task set; and wherein updating the notification message to incorporate the information about the new task item comprises incrementing a count in the graphical content.

6. A computer management system comprising:

a memory configured to store program instructions; and one or more processors operably connected to the memory, wherein the program instructions are executable by the one or more processors to:

detect an issue regarding a first computer device in a group of monitored computer devices;

determine a remedial action to address the issue, the issue and the remedial action constituting a first task item;

group the first task item with task items associated with other computer devices in the group of the monitored computer devices to compile a task set, wherein the task set is compiled based on both a common remedial action and a shared location of the other computer devices associated with the task set;

assign the task set to a first user of multiple different users for managing the task set;

generate a notification message for presentation on a display device, the notification message including graphical content comprising a virtual button that describes a collective remedial action to address the task set, wherein the one or more processors are configured to generate the notification message to prompt the first user to affirm the collective remedial action; and automatically perform the collective remedial action for the other computer devices associated with the task set without requiring per-device selection.

7. The computer management system of claim 6, wherein the issue regarding the first computer device comprises one or more of an expiring warranty, software that is outdated, firmware that is outdated, or a hardware component approaching an end of a designated operating lifetime of the hardware component, and the remedial action to address the issue comprises one or more of renewing the expiring warranty of the first computer device that is expiring, updating the software that is outdated, updating the firmware that is outdated, or ordering at least one hardware component to the hardware component that is approaching the end of the designated operating lifetime.

8. The computer management system of claim 6, wherein the program instructions are executable by the one or more processors to assign the task set to the first user by comparing the multiple different users with respect to multiple factors, the multiple factors comprising at least two of: (i) competency in performing the collective remedial action, (ii) accessibility to the other computer devices associated with the task set, (iii) proximity to the other computer devices associated with the task set, or (iv) availability to perform the collective remedial action within a designated time period.

9. The computer management system of claim 6, wherein the program instructions are executable by the one or more processors to automatically perform the collective remedial action for the other computer devices associated with the task set responsive to receiving an input selection signal generated via a user input device and indicating selection of the virtual button.

10. The computer management system of claim 6, wherein the program instructions are executable by the one or more processors to:

determine a secondary user of the multiple different users; and generate a second notification message for presentation on a second display device, the second notification message including graphical content that identifies the first user and prompts the secondary user to take over managing the task set for the first user.

11. The computer management system of claim 6, wherein the program instructions are executable by the one or more processors to:

detect a new issue regarding a second computer device in the group of the monitored computer devices after generating the notification message;

determine a new remedial action to address the new issue, the new issue and the new remedial action constituting a new task item; and update the notification message to incorporate information about the new task item into the task set in response to determining that at least one of: (i) the new remedial action is the common remedial action or (ii) the second computer device is located at the shared location of the other computer devices associated with the task set.

12. A computer program product comprising a non-transitory computer readable storage medium, the non-transitory computer readable storage medium comprising computer executable code configured to be executed by one or more processors to:

detect an issue regarding a first computer device in a group of monitored computer devices;

determine a remedial action to address the issue, the issue and the remedial action constituting a first task item;

group the first task item with task items associated with other computer devices in the group of the monitored computer devices to compile a task set, wherein the task set is compiled based on both a common remedial action and a shared location of the other computer devices associated with the task set;

assign the task set to a first user of multiple different users for managing the task set;

generate a notification message for presentation on a display device, the notification message including graphical content comprising a virtual button that describes a collective remedial action to address the task set, wherein the one or more processors are configured to generate the notification message to prompt the first user to affirm the collective remedial action; and automatically perform the collective remedial action for the other computer devices associated with the task set without requiring per-device selection.

13. The computer program product of claim 12, wherein the computer executable code is configured to be executed by the one or more processors to:

receive an input selection signal generated via a user input device and indicating affirmance of the collective remedial action, and perform the collective remedial action for the other computer devices associated with the task set in response to receiving the input selection signal.

14. The computer management system of claim 6, wherein the memory stores a scoring rubric listing weight values assigned to a plurality of prospective users that includes the first user for factors comprising firmware update proficiency, configuration compliance, data center access, networking proficiency, storage proficiency, and hardware proficiency, and wherein the program instructions are executable by the one or more processors to select a task-relevant subset of the factors for the collective remedial action of the task set, determine weighted scores for the plurality of prospective users by aggregating the weight values of the factors that are selected, and assign the task set to the first user based on a comparison of the weighted scores.

15. The computer management system of claim 6, wherein the notification message is a first notification message, the graphical content is first graphical content, and the program instructions are executable by the one or more processors to generate role-differentiated notification messages comprising: the first notification message for the first user; a second notification message for a secondary user that includes second graphical content that identifies the first user and a volunteer virtual button operable to reassign managing the task set to the secondary user; and a third notification message for a tertiary user that includes third graphical content that identifies the first user, identifies the secondary user, and includes a dismiss control to close the third notification message.

16. The computer management system of claim 15, wherein the program instructions are executable by the one or more processors to present, in the second notification message to the secondary user, a chat control that, responsive to being selected, initiates communication with the first user comprising at least one of a live text conversation in a graphical user interface, a telephone call, or a video call.

17. The computer management system of claim 6, wherein the program instructions are executable by the one or more processors to:

present, in the notification message for the first user, a graphical device-count representing a number of the other computer devices in the task set; and update the notification message to increment the graphical device-count responsive to an additional task item being added to the task set.

18. The computer management system of claim 6, wherein the program instructions are executable by the one or more processors to determine the shared location of the other computer devices associated with the task set as at least one of a city, a compound, a facility, a building, a floor, or a room.

19. The computer program product of claim 12, wherein the computer executable code is configured to be executed by the one or more processors to run a machine learning algorithm that receives, as input, at least an identified issue, a determined action for the identified issue, information about other existing task sets, and information about a group of prospective users that includes the first user, the information including weight values for multiple factors including two or more of firmware update proficiency, configuration compliance, data center access, networking proficiency, storage proficiency, or hardware proficiency, the machine learning algorithm outputting at least an identification of the task set into which a new task item is compiled and a ranked selection of the prospective users for managing the task set that is identified.

20. The computer program product of claim 12, wherein the notification message is a first notification message, the graphical content is first graphical content, and the computer executable code is configured to be executed by the one or more processors to generate a second notification message for a secondary user and a third notification message for a tertiary user, the second notification message including second graphical content that identifies the first user and a volunteer virtual button operable to reassign managing the task set, the third notification message including third graphical content that identifies the first user, identifies the secondary user, and includes a dismiss control to close the third notification message.

* * * * *